(12) United States Patent
Morikawa et al.

(10) Patent No.: US 8,084,122 B2
(45) Date of Patent: Dec. 27, 2011

(54) ZIRCONIA-CARBON-CONTAINING REFRACTORY AND METHOD FOR PRODUCING SAME

(75) Inventors: Katsumi Morikawa, Kitakyushu (JP); Daisuke Yoshitsugu, Kitakyushu (JP)

(73) Assignee: Krosaki Harima Corporation, Kitakyushu-Shi (JP)

( * ) Notice: Subject to any disclaimer, the term of this patent is extended or adjusted under 35 U.S.C. 154(b) by 414 days.

(21) Appl. No.: 12/401,952

(22) Filed: Mar. 11, 2009

(65) Prior Publication Data

US 2009/0233081 A1 Sep. 17, 2009

(30) Foreign Application Priority Data

Mar. 13, 2008 (JP) ................................. 2008-064978

(51) Int. Cl.
*B32B 3/26* (2006.01)
*B29C 71/02* (2006.01)

(52) U.S. Cl. ............... 428/317.1; 428/317.9; 428/315.5; 428/317.7; 428/312.8; 264/234; 264/235

(58) Field of Classification Search ............... 428/315.5, 428/317.9, 317.7, 312.8, 317.1; 264/234, 264/235
See application file for complete search history.

(56) References Cited

FOREIGN PATENT DOCUMENTS

| JP | 8-1293 | 1/1996 |
|---|---|---|
| JP | 11-302073 | 11/1999 |
| WO | WO 2006/112485 A1 | 10/2006 |

OTHER PUBLICATIONS

Translation of Yoshitsugu, Daisuke, et al. "Properties of High Zirconia-Graphite Material for SEN," The Technical Association of Refractories, Japan, Chuzo-yo Taikabutsu Senmon Iinkai Hokokushu, Nov. 28, 2005, vol. 87th, pp. 86-92.*
Yoshitsugu, Daisuke, et al. "Properties of High Zirconia-Graphite Material for SEN," The Technical Association of Refractories, Japan, Chuzo-yo Taikabutsu Senmon Iinkai Hokokushu, Nov. 28, 2005, vol. 87$^{th}$, pp. 86-92.
Yoshitsugu, Daisuke, et al. "Improvement of Durability of ZG Materials," Taika Zairyo, Dec. 20, 2007, No. 155, pp. 28-34.
International Search Report and Written Opinion of the International Search Authority with its English translation dated Aug. 4, 2009.
D. Yoshitsugu, et al; "Improvement of the Durability of Zg Materials by Nano-Technology;" Proceedings of the Unified International Technical Conference on Refractories; Dresden-ICD, Germany; Sep. 18-21, 2007; Label of CD-ROM version of Proceedings, Cover Sheet of booklet version of proceedings, Preface, Table of Contents, published page of article and Website information regarding the Congress (6 Sheets total.).

* cited by examiner

*Primary Examiner* — Ling Xu
(74) *Attorney, Agent, or Firm* — Kratz, Quintos & Hanson, LLP

(57) ABSTRACT

A zirconia-carbon-containing refractory includes aggregate grains, a carbon bond formed between the aggregate grains, 80% by mass or more of a $ZrO_2$ component, and a carbonaceous material, in which the total volume of open pores and the carbonaceous material in the structure of the refractory is in the range of 25% to 42% by volume, open pores each having a diameter of 10 μm or more account for 30% or less of the total volume of open pores in the structure of the refractory, and carbonaceous material grains each having a maximum length exceeding 45 μm in the carbonaceous material in the zirconia-carbon-containing refractory account for less than 60% by mass of the total mass of the carbonaceous material except the bonding carbon in the zirconia-carbon-containing refractory.

6 Claims, 2 Drawing Sheets

ZIRCONIA-CARBON-CONTAINING REFRACTORY AND METHOD FOR PRODUCING SAME

BACKGROUND OF THE INVENTION

1. Field of the Invention

The present invention relates to refractories used for submerged nozzles and the like for use in continuous casting of steel. In particular, the present invention relates to a zirconia-carbon-containing refractory having high corrosion resistance and high thermal shock resistance.

2. Description of the Related Art

A submerged nozzle for use in continuous casting of steel is used to transfer molten steel from a tundish to a mold. The submerged nozzle is used to prevent molten steel from coming into contact with air to inhibit oxidation of molten steel and used to charge molten steel into the mold while the flow of molten steel is adjusted. This results in the prevention of contamination of steel with slag layer floating on the surface of molten steel and nonmetallic inclusions in molten steel, thereby improving the quality of steel and ensuring the stability of operation. In general, a molten glass layer, referred to as a "mold powder layer", is present on the surface of molten steel in the mold. The molten glass layer contains CaO, $SiO_2$, $Na_2O$, $K_2O$, $Al_2O_3$, $CaF_2$, C, and the like and is thus highly erosive to $Al_2O_3$, $SiO_2$, C, and the like constituting the submerged nozzle, so that operation over long periods of time reduces the corrosion resistance of the submerged nozzle. Thus, a portion of the submerged nozzle coming into contact with the mold powder is often composed of a zirconia material having corrosion resistance against molten glass. To ensure thermal shock resistance, zirconia-carbon ($ZrO_2$—C) material is generally used as a powder line material.

Various improvements in the corrosion resistance of the powder line material have been achieved because the corrosion resistance directly affects the lifetime of the nozzle. In general, it is known that an increase in zirconia content of the material improves the corrosion resistance. Meanwhile, a larger zirconia content increases the thermal expansion coefficient and the elastic modulus of the $ZrO_2$—C material, disadvantageously causing breaks in use and hindering the operation. To improve the thermal shock resistance, the graphite content needs to be increased. As described above, however, an increase in graphite content reduces the corrosion resistance; hence, it is important to strike a balance between the zirconia content and the graphite content. In general, from the viewpoint of stably using the submerged nozzle, the upper limit of the amount of zirconia aggregates incorporated is about 90% by mass.

For a submerged nozzle composed of several types of materials such as an alumina-graphite material or an alumina-silica-graphite material, a partially stabilized aggregate or a completely stabilized aggregate raw material containing 3% to 10% by mass of CaO, MgO, $Y_2O_3$, or the like exhibiting relatively linear thermal expansion characteristics is generally applied from the viewpoint of thermal structural stability in receiving molten steel. The upper limit of the proportion of a $ZrO_2$ component in a $ZrO_2$—C material used for the powder line portion is about 86% by mass because of the incorporation of bonding carbon that bonds aggregates together. To use a high corrosion-resistant powder line portion that has a low incidence of breaking and can contribute to stable operation, the proportion of the $ZrO_2$ component is generally 82% by mass or less.

For example, Japanese Unexamined Patent Application Publication No. 11-302073 discloses a zirconia graphite refractory having excellent corrosion resistance and containing 70% to 95% by mass of a zirconia material and 5% to 30% by mass of graphite, in which zirconia particles each having a diameter of 45 μm or less account for 70% or more of the total amount of the zirconia particles.

Japanese Unexamined Patent Application Publication No. 8-1293 discloses a technique in which a portion of a submerged nozzle, used for continuous casting, coming into contact with a molten mold powder is composed of a zirconia-graphite material containing 50% to 90% by mass of a CaO-stabilized zirconia raw material having a silica content of 0.30% by mass or less, 0% to 30% by mass of a baddeleyite raw material (provided that the total amount of the CaO-stabilized zirconia raw material and the baddeleyite raw material is 60% to 91% by mass), and 10% to 35% by mass of a graphite raw material.

The zirconia-graphite refractory and the zirconia-graphite material described in the foregoing Patent Documents, however, do not sufficiently have both thermal shock resistance and corrosion resistance in a high production operation nowadays.

A zirconia-graphite material which does not break by thermal shock in operation and has better corrosion resistance than those of the materials described above is thus required.

Hitherto, at a $ZrO_2$ component content of about 80% by mass or less, a larger $ZrO_2$ component content results in improvement in corrosion resistance against the powder. A $ZrO_2$ component content exceeding about 80% by mass, however, is liable to lead to a reduction in corrosion resistance. Thus, the upper limit of the $ZrO_2$ component content is about 83% by mass.

SUMMARY OF THE INVENTION

Accordingly, it is a first object of the present invention to improve the corrosion resistance of a zirconia-carbon-containing refractory having a high $ZrO_2$ content exceeding about 80% by mass. It is a second object of the present invention to also improve the corrosion resistance of a zirconia-carbon-containing refractory having a $ZrO_2$ content of about 83% by mass or less ($ZrO_2$ content of about 80% by mass or more). Thereby, a submerged nozzle, for continuous casting, that can be used for long operation is provided.

A submerged nozzle, for continuous casting, having corrosion resistance improved by increasing the $ZrO_2$ content tends to have a low thermal shock resistance. It is thus another object of the present invention to also improve the thermal shock resistance and to provide a zirconia-carbon-containing refractory having excellent corrosion resistance and excellent thermal shock resistance.

The inventors have found that a main reason for the tendency of a decrease in corrosion resistance at high zirconia contents, in particular, at $ZrO_2$ component contents exceeding about 80% by mass is that the apparent porosity (the proportion of open pores) increases as the $ZrO_2$ component content increases and have found that in a refractory having such a high $ZrO_2$ component content, slippage of refractory aggregates, i.e., solid lubricity, is not sufficiently obtained during compression molding in a process of producing the refractory because of a small carbonaceous material content, in particular, a small graphite content, resulting in a low-density refractory having a coarse structure.

The inventors have focused their attention on the amount of open pores in the structure of a zirconia-carbon-containing refractory having a high zirconia content and have found that the presence of the open pores promotes the penetration of a molten powder into the structure to increase the contact area between the refractory and the molten powder in a mold used for continuous casting, thereby accelerating the collapse of the zirconia aggregates (destabilizing).

The mechanism of dissolution loss of the zirconia carbon-containing refractory constituting the powder line portion of the nozzle for continuous casting is described below. Repetitions of the following stages:
(a) a stage in which the carbonaceous component in the refractory is dissolved into molten steel when molten steel comes into contact with the zirconia-carbon-containing refractory; and
(b) a stage in which zirconia aggregates exposed at a surface of the powder line portion by leaching the carbonaceous component are dissolved into the powder layer, causes dissolution loss of the refractory. Molten steel generally has a low carbon content; hence, carbon is rapidly dissolved to complete the dissolution of the carbonaceous component in a short period of time. Thus, the rate of dissolution loss is mainly limited to the dissolution time of oxide aggregates into the powder component. The corrosion resistance is thus improved by increasing the area ratio of $ZrO_2$ and reducing the area ratio of the carbonaceous material aggregates exposed at a dissolution interface.

Also, reducing contact areas between the carbonaceous component in the refractory and molten steel and between $ZrO_2$ in the refractory and the powder layer, therefore, contributes to a reduction in the dissolution loss of the refractory.

On the basis of these findings, the inventors have found that in a zirconia-carbon-containing refractory having a high zirconia content, reducing the total volume of open pores and the carbonaceous material results in a significant reduction in the rate of dissolution loss.

A zirconia-carbon-containing refractory according to the present invention includes aggregate grains, a carbon bond formed between the aggregate grains, 80% by mass or more of a $ZrO_2$ component, and a carbonaceous material, in which the total volume of open pores and the carbonaceous material in the structure of the refractory is in the range of 25% to 42% by volume, open pores each having a diameter of 10 μm or more account for 30% or less of the total volume of open pores in the structure of the refractory, and carbonaceous material grains each having a maximum length exceeding 45 μm in the carbonaceous material in the zirconia-carbon-containing refractory account for less than 60% by mass of the total mass of the carbonaceous material except the bonding carbon in the zirconia-carbon-containing refractory.

The amount of "$ZrO_2$ component" indicates the amount of $ZrO_2$ component containing $HfO_2$, which is difficult to separate, and excluding stabilizers, such as CaO, MgO, and $Y_2O_3$. The term "carbon bond" is used to indicate a structure in which an organic binder is carbonized in a nonoxidative atmosphere so as to bond or fix the grains and the like constituting the refractory to one another.

The term "open pores" is used to indicate pores exposed to the outside, excluding pores (closed pores) embedded in the structure. The contact area between the powder and the carbonaceous material and the $ZrO_2$ component in the refractory varies depending on the volume of the open pores. The proportion of the open pores with respect to the whole refractory can be measured as an apparent porosity by a measurement method according to JIS R 2205.

The inventors have conducted various experiments and studies and have found that a total volume of the open pores and the carbonaceous material in the structure of 42% by volume or less results in significantly improved corrosion resistance compared with zirconia-carbon-containing refractories used in the past.

The open pores and the carbonaceous material in the structure also impart resistance to thermal shock (hereinafter, also referred to as "thermal shock resistance") to the refractory, A total volume of less than 25% results in improvement in corrosion resistance but a reduction in thermal shock resistance to increase the risk of breaking, which is not preferred.

In the related art, there have been suggestions of the relationship between thermal shock resistance and either carbonaceous component or apparent porosity. In particular, for a refractory having a $ZrO_2$ component content exceeding about 83% by mass, particularly as means for improving corrosion resistance, simultaneous control of both of the volume of a carbonaceous material and the apparent porosity of the structure of the refractory have not been reported.

The proportion of the sum of the volume of open pores and the volume of a carbonaceous material in a zirconia-carbon-containing refractory can be determined by the sum of the measured volume of open pores and the calculated volume of the carbonaceous material in the target refractory. The volume of the open pores is a value expressed as an apparent porosity measured by a method according to JIS R 2205. With respect to a method for calculating (determining) the volume of the carbonaceous material, the volume and the proportion of the volume of the carbonaceous material can be calculated from the chemical composition of the zirconia-carbon-containing refractory, the density of $ZrO_2$ aggregates, and the density of carbonaceous material particles and the like.

Control of the sum of the volume of the open pores and the volume of the carbonaceous component readily dissolved by contact with molten steel results in significant improvement in the corrosion resistance of the zirconia-carbon-containing refractory having a high zirconia content.

Furthermore, with respect to the open pores, in the case where the foregoing refractory is used in an operation under conditions in which a molten powder is present on the surface of molten steel in a mold used for continuous casting, the inventors have found that the molten powder penetrates readily to open pores each having a diameter of 10 μm or more and that the amount (the volume ratio) of open pores each having a diameter of 10 μm or more correlates with the corrosion resistance.

The pore diameter can be determined by a test method for pore size distribution by mercury porosimetry according to JIS R 1655.

The inventors have found that a lower volume proportion of open pores having a diameter of 10 μm or more with respect to the total volume of open pores results in improvement in corrosion resistance and that a proportion of 30% or less results in significant improvement in corrosion resistance.

The reason for this may be that even in the case where the open pores each having a diameter of 10 μm or more are partially present, the penetration of molten powder into open pores each having a diameter of 10 μm or more causes partial dissolution or collapse of the refractory structure, e.g., the carbonaceous material, around the open pores and that a larger number of damaged portions of the refractory structure is liable to lead to the expansion and linkage of the damaged portions, thereby extensively promoting damage to the refractory structure.

Thus, most preferably, the volume proportion of the open pores having a diameter of 10 μm or more is 0%. In other words, most preferably, all open pores have diameters of less than 10 μm.

Thus, the proportion of carbonaceous material grains each having a maximum length exceeding 45 μm in the carbonaceous material is set at 60% by mass or less of the total mass of the carbonaceous material except the bonding carbon in the zirconia-carbon containing refractory, thereby reducing the volume proportion of the open pores each having a diameter of 10 μm or more, so that it is possible to more easily provide a zirconia-carbon-containing refractory of the present invention.

With respect to a production process, it is well known that since cold isostatic pressing (hereinafter, simply referred to as "CIP") is generally employed to shape a nozzle for continuous casting, the formability of a green body significantly affects the final quality, in particular, apparent porosity and pore size distribution. In a zirconia-carbon-containing refractory having the proportion of the total volume of the open pores and the carbonaceous material and having the volume proportion of the open pores each having a diameter of 10 μm or more described above, in the case of a refractory having a $ZrO_2$ content of less than 80%, it is possible to obtain a certain desired level of an article by adjusting the particle size distribution, wetting characteristics, compacting pressure, and the like of a green body before shaping. However, as the amount of $ZrO_2$ aggregates is increased, in particular, in the case where the $ZrO_2$ content is 80% or more and where the carbonaceous material, such as graphite, having good lubricity facilitating rearrangement of particles in a shaping step is reduced, the apparent porosity of a $ZrO_2$-graphite material under a constant compacting pressure tends to increase. Thus, it is often difficult to obtain a desired article by only adjusting the production conditions as described above. With respect to the design of mix, typically, $ZrO_2$ aggregates having a particle size of 0.045 mm to 1 mm are mainly used in a $ZrO_2$-graphite material, in many cases, in order to reduce the dissolution rate into molten slag and improve the thermal shock resistance. In the same way that the rate of dissolution of large rock sugar into water is lower than that of powdered sugar, the rate of dissolution of zirconia aggregates into molten slag is improved by the use of coarse aggregates. With respect to thermal shock resistance, the use of fine powder having a particle size of 45 μm or less, the fine powder being readily sintered during casting, is liable to cause an increase in strength and elastic modulus due to sintering. For this reason, the amount of the fine powder having a particle size of 45 μm or less is limited. Therefore, the foregoing particle size of the $ZrO_2$ aggregates is mainly used.

As described above, from the viewpoints of the limitation of production of the nozzle for continuous casting and the design of mix such as the particle size of zirconia aggregates used, most preferably, a carbonaceous material having a particle size of 45 μm or less, which is smaller than the zirconia aggregates, is used in order to improve lubricity during shaping to form a dense compact and to inhibit sintering during casting.

Furthermore, the inventors have found that in the case where carbonaceous material grains each having a diameter exceeding 45 μm account for 60% by mass or less of the total mass of the carbonaceous material except a bonding carbon in the zirconia-carbon-containing refractory, the apparent porosity and open pores each having a diameter of 10 μm or more in the refractory of a product are significantly reduced, thereby markedly improving the corrosion resistance. A carbonaceous material having a grain size of 45 μm or less of less than 40% leads to insufficient rearrangement of zirconia particles, so that a sufficient effect as described above is not provided.

Examples of the carbonaceous material include fine powders of graphite such as scaly graphite and earthy graphite; and amorphous and crystalline carbon black. These may be used separately or in combination.

The foregoing zirconia-carbon-containing refractory having excellent corrosion resistance has a dense structure and thus reduced thermal shock resistance. In particular, a refractory having a $ZrO_2$ component content exceeding about 86% has reduced thermal shock resistance and is brittle, so that it is difficult to stably perform casting within variations of operation. Thus, the carbon bond in the structure of the foregoing zirconia-carbon-containing refractory according to the present invention may contain the carbonaceous material having a fibrous structure with a diameter of 50 nm or less, thereby significantly improving the thermal shock resistance.

The reason the structure containing the carbonaceous material having a fibrous structure with a diameter of 50 nm or less significantly improves the thermal shock resistance of the zirconia-carbon-containing refractory may be as follows.

The structure of the zirconia-carbon-containing refractory includes aggregate grains, such as the $ZrO_2$ aggregates and the carbonaceous material grains, e.g., graphite grains, and the carbon bond. The zirconia aggregate grains are three-dimensionally arranged so as to be surrounded by a carbon bond matrix including the carbonaceous material, such as graphite, and the carbon bond. The carbon bond matrix is three-dimensionally arranged with graphite as a filler. Thus, the properties of the carbon bond matrix significantly affect the macroscopic physical properties of the zirconia-carbon-containing refractory.

The carbon bond connecting aggregate grains to each other is generally formed by baking a phenolic resin that forms a large amount of carbonaceous residues, under nonoxidative conditions. The carbon is generally referred to as amorphous glassy carbon (hereinafter, simply referred to as "glassy carbon") that is dense and brittle and has a high elastic modulus.

The carbonaceous material having a fibrous structure with a diameter of 50 nm or less (hereinafter, simply referred to as "fibrous carbon") has three-dimensionally irregular orientation. The fibrous carbon is intricately interwined with each other and dispersed in the structure. The carbonaceous material having such a structure has a "flexible structure", which is mechanically deformable, and a high ability to distribute and absorb stresses. Thus, the matrix portion of the carbon bond including the flexible structure is also flexible.

Furthermore, the fibrous carbon has excellent tensile strength compared with glassy carbon and other structures in the carbon bond and also serves as a reinforcement for the structure. Thus, the fracture toughness of the carbon bond is also enhanced by the fibrous carbon.

The fibrous carbon is three-dimensionally continuously arranged in the matrix of the carbon bond in combination with fine graphite powder, carbon black, or the like serving as fillers, thereby resulting in a bond structure in which the carbon bond has a flexible, highs toughness matrix portion (hereinafter, simply referred to as a "fibrous carbon-containing structure"). That is, the continuous arrangement of the carbon bond structure containing fibrous carbon serving as a carbon fiber filler in the refractory structure between the aggregate grains result in the refractory having a flexible structure, a high toughness, improved macroscopic physical properties, a reduced elastic modulus, and a reduced thermal expansion coefficient. Furthermore, improvement in the strength of a microscopic structure results in the inhibition of the occurrence of a fracture origin leading to the fracture of the refractory, thereby providing a high fracture toughness.

Here, the "carbonaceous material having a fibrous structure with a diameter of 50 nm or less" is used to indicate nanoscale ultrafine fibrous carbon, such as carbon nanotubes (hereinafter, simply referred to as "CNTs") and carbon nanofibers (hereinafter, simply referred to as "CNFs") and aggregate structures thereof.

The thickness of the carbon bond between carbonaceous fillers in the carbon matrix used for a nozzle for continuous casting is about several hundreds of nanometers. To increase the continuity of fine fibrous structure, a smaller unit of the fibrous structure is probably better. A unit size exceeding 50 nm leads to insufficient adhesion to the carbonaceous raw material to be formed into a filler; hence, the unit size is preferably 50 nm or less.

Furthermore, in the refractory of the present invention, the refractory structure may contain fine particles composed of a transition metal or a transition metal compound, the fine particles each having a diameter of 1,000 nm or less, in which the proportion of the transition metal or a metal derived from the transition metal compound is 0.5% by mass or less (excluding 0% by mass) with respect to the total mass of the refractory.

In the case where the refractory structure may contain the fine particles composed of a transition metal or a transition metal compound, the fine particles each having a diameter of 1,000 nm or less, the fine particles of the transition metal serves as a catalyst to promote the formation of fine carbon fibers during, for example, heat treatment in the course of the production process of the refractory.

To improve the thermal shock resistance of the refractory, in particular, it is thus effective and preferable to disperse the fine particles in carbon bond of the refractory structure.

The reason for the fine particles each having a diameter of 1,000 nm or less is that since the thickness of the carbon bond between carbonaceous fillers in the carbon matrix is about several hundreds of nanometers, the presence of particles larger than the thickness of the carbon bond results in an insufficient catalytic effect, so that it is difficult to form the fibrous carbon structure from the carbon bond by the catalytic effect during heat treatment in a nonoxidative atmosphere and it is necessary to incorporate a large amount of catalyst. A metal catalyst content of 0.5% by mass or more disadvantageously results in a significant deterioration in oxidation resistance because the metal catalyst serves as an oxidation catalyst and thus is not preferred.

Details of the formation of the fine fibrous carbon structure are not clear. Examples of a conceivable mechanism include a mechanism in which the fine particles composed of a transition metal, e.g., Fe, Ni, or Co, serving as a catalyst are reacted with a hydrocarbon-based gas generated from a phenolic resin and the like in the course of heating on surfaces of the catalyst particles to form CNTs and CNFs; and a mechanism in which a phenolic resin and the like are carbonized in the course of heat treatment, resulting carbon around the metal catalyst particles in the bonding carbon forms a solid solution with the metal catalyst particles, and carbon atoms are rearranged to form CNTs, CNFS, and the like with the catalyst particles as cores.

In any case, the particle size of the metal catalyst serving as a core is believed to determine the size of the carbon fibers. The limitation of a particle size of 1,000 nm or less is efficient for the formation of fine fibrous carbon structure in the carbon bond. The particle size is preferably 50 nm or less.

The transition metal in the refractory structure of a product through a production process including heat treatment can be identified as an elemental metal or a transition metal compound such as a carbide.

Examples of the transition metal that can be used include Ni, Co, Fe, Ti, Cr, Pt, Rh, and Pd. These metals may be used separately or in combination. Alternatively, compounds thereof may be used separately or in combination.

At present, catalytic hydrocarbon decomposition in which a gaseous hydrocarbon is reacted at a high temperature in the presence of a catalyst to form multilayer CNTs with high efficiency is known as a method for synthesizing an ultrafine fibrous carbon structure such as CNTs. A method in which a pyrolytic resin and a metal catalyst are subjected to heat treatment to form amorphous nanoscale carbon tubes is also known (see WO00/40509 and Japanese Unexamined Patent Application Publication No. 2002-293524).

It is, however, impossible to mass-produce CNTs by these methods. Furthermore, the production cost is very high; hence, these methods are not commercially practical.

In a narrow space (space where the carbon bond is formed) between aggregate particles in the refractory during heat treatment, the fibrous carbon structure is believed to be formed in a minute space in the entire carbon bond by the foregoing process.

The resulting ultrafine fibrous carbon structure or a minute space simultaneously formed in the ultrafine fibrous carbon structure can absorb stresses and the deformation of its surrounding structures and can terminate crack extension, thereby resulting in the carbon bond having a higher strength, a lower elastic modulus, and a higher toughness as described above.

The inventors have found that in the zirconia-carbon-containing refractory according to the present invention, the incorporation of the carbonaceous material having a fibrous structure with a diameter of 50 nm or less into the carbon bond in the structure of the refractory and the incorporation of the fine particles composed of a transition metal or a transition metal compound into the refractory structure, the particles each having a diameter of 1,000 nm or less, result in significant improvement in the thermal shock resistance.

As described above, according to the present invention, in the zirconia-carbon-containing refractory having a high $ZrO_2$ content of 80% by mass, it is possible to provide the zirconia-carbon-containing refractory having excellent corrosion resistance attributed to the inhibition of the penetration of the molten powder into the refractory structure compared with the related art.

The incorporation of the fibrous carbon structure having a diameter of 50 nm or less into the structure of the zirconia-carbon-containing refractory having a high zirconia content reduces the elastic modulus and the thermal expansion coefficient and improves the fracture toughness. It is thus possible to provide the zirconia-carbon-containing refractory having high corrosion resistance and high thermal shock resistance compared with the related art.

According to the present invention, a method for producing a zirconia-carbon-containing refractory having aggregate grains, a carbon bond formed between the aggregate grains, 80% by mass or more of a $ZrO_2$ component, and a carbonaceous material includes a first step of kneading a green body containing carbonaceous aggregate particles, wherein carbonaceous aggregate particles each having a maximum length of 45 μm or less account for 40% by mass or more of the total mass of the carbonaceous aggregate particles except a bonding carbon, a second step of forming the kneaded green body in the first step into a compact, and a third step of subjecting the resulting compact to heat treatment and processing.

According to the method, it is possible to provide a zirconia-carbon-containing refractory in which the total volume of open pores and the carbonaceous material in the structure of the refractory as a product is in the range of 25% to 42% by volume and in which open pores each having a diameter of 10 µm or more account for 30% or less of the total volume of open pores in the structure of the refractory.

In the first step, the green body may contain fine particles composed of a transition metal or a transition metal compound, the fine particles each having a diameter of 1,000 nm or less, or a metal catalyst that promotes the formation of fine carbon fibers, in which the proportion of the transition metal or a metal derived from the transition metal compound is 0.5% by mass or less (excluding 0% by mass) with respect to the total mass of the refractory.

The metal catalyst is incorporated into the green body, and the green body is kneaded to disperse the metal catalyst in the green body. As described above, when the organic binder in the green body is carbonized during heat treatment to form the carbon bond, the fibrous carbon structure can be intensively formed in the carbon bond by the catalytic effect.

DESCRIPTION OF THE PREFERRED EMBODIMENTS

Figure 1B:
FIG. 1B is a photograph of a structure of a zirconia-carbon-containing refractory having a $ZrO_2$ content of 88% by mass according to Comparative Example with a field of view of about 500 µm.

A method for producing a zirconia-carbon-containing refractory according to an embodiment of the present invention (hereinafter, simply referred to as a "first production method") will be described below.

As a first step, refractory raw materials (hereinafter, simply referred to as "aggregate particles"), such as a zirconia material, a carbonaceous material, and an additive, e.g., a metal, a metal carbide, or a metal nitride, in order to prevent oxidation of a carbon component in the refractory, improve the strength of a refractory structure, and the like are mixed to form a mixed powder. An organic binder is added thereto, followed by kneading to form a green body.

To obtain a zirconia-carbon-containing refractory of the present invention, it is necessary to increase the solid lubricity of the green body (including gaps between aggregate particles and between the green body and a mold) during compacting in the production process.

The zirconia particles that account for the large portion of the aggregate particles have poor solid lubricity. It is thus difficult to obtain a dense refractory structure of the present invention when a high pressure is applied to the green body while a large number of zirconia aggregate particles are in contact with each other.

In the related art, relatively large scaly graphite having an excellent stress relaxation ability and excellent solid lubricity is mainly used as a carbonaceous material serving as aggregate particles.

In the case of a zirconia-carbon-containing refractory having a $ZrO_2$ component content of 80% by mass or more and a low carbonaceous material content, however, the use of such a large scaly graphite is liable to cause a reduction in lubricity in the green body (in the refractory structure) and an increase in the nonuniformity of the degree of lubricity in the green body (in the refractory structure) as the $ZrO_2$ component content is increased, i.e., as the carbonaceous material content is reduced.

As a result, the self-compacting ability (densification) during shaping is reduced to increase the amount of open pores. Furthermore, diameters of the open pores are also increased to facilitate the penetration of the molten powder into the resulting refractory structure, thereby reducing corrosion resistance. Moreover, the nonuniformity of the refractory structure is liable to cause a reduction in thermal shock resistance.

For the zirconia-carbon-containing refractory having a $ZrO_2$ component content exceeding 80% by mass and a low carbonaceous material content according to the present invention, it is difficult to obtain the apparent porosity and the proportion of the open pores characteristic of the present invention by the use of large scaly graphite in the related art.

Here, the term "carbonaceous material" is used to indicate a crystalline carbonaceous aggregate raw material such as graphite, an amorphous carbonaceous raw material such as carbon black, or the whole of a carbonaceous material including the carbon bond. A carbonaceous material useful to improve the properties of the green body during shaping does not contain a carbon bond.

The term "carbon bond" is used to indicate a structure formed by carbonizing an organic binder in a nonoxidative atmosphere to bond or fix particles and the like constituting the refractory to each other and indicate a carbonaceous phase having a continuous structure bonding constitutional raw particles in the refractory structure. The carbon bond is formed by baking an organic binder for carbonization, the organic binder being composed of one of a phenolic resin, tar, and pitch or a mixture of any combination thereof.

The term "structure" is used to indicate the relationship of pores to particles having various shapes and sizes in a refractory product (JIS R2001).

In the present invention, as described above, the carbonaceous material fine powder having a diameter of 45 µm or less is used in the entire carbonaceous material (excluding the bonding carbon) in the green body and accounts for 40% by mass or more of the total mass of the carbonaceous material.

In the case where the proportion of the carbonaceous material having a diameter of 45 µm or less is converted into a proportion in a refractory product, a carbonaceous material having a maximum length exceeding 45 µm needs to account for less than 60% by mass of the total mass of carbon including the bonding carbon in the refractory.

Here, the term "45 µm or less" is used to indicate a size passing through a sieve with an opening of 45 µm according to JIS Z8801.

The proportion in the refractory product is determined as follows: The target refractory is fired in an oxidative atmosphere at about 350° C. to 550° C. for 5 to 24 hours to allow the bonding carbon that is oxidized at a low temperature to disappear. The resulting powdered refractory including zirconia aggregate particles is classified with a sieve with an opening of 45 µm according to JIS Z8801 into a powder retained on the surface of the sieve and a powder passing through the sieve. The amount of carbon in each of the powders is measured. It is possible to determine the proportion of the carbonaceous material having a diameter of 45 µm or less by dividing the amount of carbon of the powder passing through the sieve by the total amount of carbon of both powders.

Examples of a raw material of the carbonaceous material fine powder having a diameter of 45 μm or less include scaly graphite, earthy graphite, artificial graphite, and carbon black. These may be used separately or in combination. In the case of using a single material, most preferably, scaly graphite is used because of its excellent solid lubricity and excellent stress relaxation ability.

As graphite, scaly graphite, earthy graphite, and the like having a carbon purity of 90% by mass or more can be used. As described above, the graphite material having a maximum length of 45 μm or less preferably contains 40% by mass or more of a graphite fine powder having a thickness of 10 μm or less.

A thickness exceeding 10 μm results in a reduction in the number of the lubricant aggregates during shaping, so that it is difficult to provide desired formability. In the case where the proportion of the graphite fine powder having a thickness of 10 μm or less is less than 40% by mass, the number of the solid lubricant is reduced, so that desired lubricity is not provided. Thus, a dense compact is not obtained.

As carbon black, typical amorphous carbon black and graphitized carbon black with a high crystallinity may be used.

In the case of using a plurality of types of carbonaceous materials, for example, the incorporation of about 1% to 20% by mass of carbon black ultrafine powder having a diameter of about 100 nm or less into scaly graphite having a diameter of 45 μm or less with respect to 100% by mass of the total mass of the carbonaceous materials results in a synergistic effect and is thus preferred.

In this way, a reduction in the size of the aggregate particles of the carbonaceous material results in a reduction in the unit volume of a defective portion of the refractory structure when the carbonaceous material disappears by erosion, oxidation, or the like during the use of the refractory, thereby improving the corrosion resistance and oxidation resistance.

Also from the viewpoint of physical properties other than apparent porosity, when graphite fine powder or carbon black is used, graphite fine powder or carbon black is readily incorporated in a three-dimensional carbon matrix formed by the carbonization of the organic binder to promote the formation of the three-dimensional carbon matrix, which is advantageous to a reduction in expansion coefficient, a reduction in elastic modulus, an increase in strength, an increase in toughness, and the like.

In this way, the use of the carbonaceous material fine powder having a diameter of 45 μm or less improves the disadvantages in the related art and provides a dense zirconia-carbon-containing refractory having particularly excellent corrosion resistance.

In the zirconia-carbon-containing refractory according to the present invention, with respect to the particle size distribution of the zirconia aggregate particles, $ZrO_2$ aggregates each having a diameter of 45 μm or more preferably account for 65% to 90% by mass of the total mass of the zirconia aggregate particles.

A larger proportion of $ZrO_2$ aggregates each having a diameter of less than 45 μm causes easy dissolution of the $ZrO_2$ component in the molten powder layer in the mold, significantly reducing the corrosion resistance. Thus, the proportion of the $ZrO_2$ aggregates each having a diameter of 45 μm or more is set at 65% to 90% by mass of the total mass of the $ZrO_2$ aggregates, thereby inhibiting the dissolution of $ZrO_2$ to improve the corrosion resistance.

The $ZrO_2$ aggregates each having a diameter of less than 45 μm have an disadvantage from the viewpoint of improving the corrosion resistance because of an increase in the rate of dissolution of $ZrO_2$ into the molten powder layer. From the viewpoint of inhibiting compositional segregation to densify the structure of the zirconia-carbon containing refractory, however, an appropriate amount of the $ZrO_2$ aggregates each having a diameter of less than 45 μm is required. In the zirconia-carbon-containing refractory of the present invention, the $ZrO_2$ aggregates each having a diameter of less than 45 μm preferably account for 10% to 35% by mass of the total mass of the $ZrO_2$ aggregates.

The upper limit of the diameter of each of the $ZrO_2$ aggregates is preferably 0.5 mm or less from the viewpoint of inhibiting the occurrence of segregation when the green body of the zirconia-carbon-containing refractory is charged into a molding box for use in CIP (hereinafter, simply referred to as a "molding box").

The zirconia aggregate particles may contain stabilized zirconia, partially stabilized zirconia (hereinafter, collectively referred to as "stabilized zirconia") with CaO, MgO, $Y_2O_3$, or the like, or unstabilized zirconia.

Examples of zirconia having a degree of stabilization of 50% or more include partially and completely stabilized zirconia with CaO, MgO, $Y_2O_3$, or the like. In particular, from the viewpoint of increasing the thermal shock resistance and the $ZrO_2$ content, CaO-stabilized zirconia is most preferably used because only a small amount of CaO added provides a relatively high stabilization effect.

To impart oxidation resistance and improve the strength, the green body may further contain, for example, a metal fine powder of Al, Mg, or Si, a carbide powder of SiC or $B_4C$, and a nitride powder of BN in a total amount of about 2% by mass or less with respect to 100% by mass of the total mass of the components constituting the zirconia-carbon-containing refractory as a product (the amount added can be adjusted in response to variations in oxidation in operations.

The organic binder is added to the mixture of aggregate particles, followed by kneading to form the green body.

Mixing and kneading can be performed with a mixer commonly used for mixing and kneading of refractories.

Examples of the organic binder added in kneading include pitch, tar, and phenolic resins, which provide carbonaceous residues by heat treatment. These may be used separately or in combination as a mixture. To increase the formation of the carbon bond, a material that provides a larger amount of a carbonaceous residue is preferred.

As a second step, the green body is charged into a molding box including an elastic housing, a metal rod, and the like and subjected to shaping by CIP at a constant compacting pressure.

The compacting pressure and the like can be appropriately optimized in response to the design conditions, such as the structure and size of the formed article.

As a third step, the formed article is dried and fired in a nonoxidative atmosphere.

The firing step may be performed in a sealed vessel filled with a carbonaceous filler or simply isolated from the outside air under a nonoxidative atmosphere. The maximum firing temperature may be set at about 600° C. to about 1,200° C. In the case where the same effect as firing can be obtained by the use of heat generated in a preheating step in operation, it is possible to provide a product by firing at temperature of less than about 600° C. In any case, to remove a solvent and water or promote the strength of the binder, a drying step at about 150° C. to 250° C. is preferably performed before firing at the maximum temperature.

The dried and fired formed article is subjected to surface processing, as needed, and an accessory such as a metal case is attached.

Next, a method for producing a zirconia-carbon-containing refractory of the present invention (hereinafter, simply referred to as a "second production method") will be described below, the zirconia-carbon-containing refractory containing a carbonaceous material having a fibrous structure with a diameter of 50 nm or less and fine particles composed of a transition metal, a transition metal compound, a metal catalyst, or a metal catalyst salt, the fine particles each having a diameter of 1,000 nm or less, and the catalyst being configured to promote the formation of fine carbon fibers.

The second production method is basically the same as the first production method. In the second production method, in a mixing or kneading step to obtain a green body, a transition metal, a transition metal compound, a metal catalyst, or a metal catalyst salt is added to refractory materials or an organic binder, the catalyst being configured to promote the formation of fine carbon fibers.

Hereinafter, points different from the first production method will be described below.

In the first step, preferably, the fine particles composed of a transition metal, a transition metal compound, a metal catalyst, or a metal catalyst salt is added to the green body, the fine particles each having a diameter of 1,000 nm or less, and the catalyst being configured to promote the formation of fine carbon fibers.

As a method of adding the fine particles composed of a transition metal, a transition metal compound, a metal catalyst, or a metal catalyst salt, the fine particles each having a diameter of 1,000 nm or less, and the catalyst being configured to promote the formation of fine carbon fibers, to the green body, the particles may be added to a mixture of other refractory raw materials. To increase the dispersibility, the particles are preferably dispersed in the organic binder as a raw material before kneading the green body.

In this way, previous dispersion of the fine particles composed of a transition metal, a transition metal compound, a metal catalyst, or a metal catalyst salt, in the organic binder, the catalyst being configured to promote the formation of fine carbon fibers, results in the intensive formation of fibrous carbon in the carbon bond formed by the carbonization of the organic binder, thereby efficiently improving the physical properties of the refractory.

That is, a mixture of the organic binder of one of a phenolic resin, tar, and pitch or a combination thereof and a solution containing the fine particles or a colloidal solution containing the fine particles each having a diameter of 1,000 nm or less dispersed in a solvent, the fine particles being composed of a transition metal, a transition metal compound, a metal catalyst, or a metal catalyst salt, the catalyst being configured to promote the formation of fine carbon fibers, (hereinafter, simply referred to as a "transition metal solution") is preferably added to a mixture of other refractory materials, followed by kneading.

Examples of the transition metal that can be used include Ni, Co, Fe, Ti, Zr, Cr, and Pt. In particular, from the viewpoint of achieving a high catalytic effect on the synthesis reaction of an ultrafine fibrous carbon structure such as CNTs, Ni, Co, Fe, and Cr can be suitably used.

In the case where a transition metal salt is used in the transition metal solution, a transition metal salt that is not hydrolyzed so as not to cause the change of a phenolic resin with time is used. Examples of such a transition metal salt that can be suitably used include metallic soaps $(R)_n$-M(O), metal acetylacetonates $(C_5H_7O_2)_n$-M(O), metal octoate compounds, and metal naphthenate compounds, wherein M represents a metal, e.g., Ti, Zr, Cr, Ni, Co, Fe, Cu, or Pt; and R represents an alkyl group, such as methyl, ethyl, propyl, n-butyl, or phenyl. Furthermore, a solution of a transition metal inorganic compound, e.g., a chloride, a sulfide, an acetic acid compound, or a phosphoric acid compound of a transition metal, can be used. Each of the transition metal compounds is used by dissolving the compound in water or an organic solvent such as alcohol or mineral oil to form a solution (transition metal catalyst solution).

In particular, the transition metal salt having good compatibility with the organic binder is appropriately selected in order to form a uniform mixture when the transition metal salt is mixed with the organic binder. For example, in the case where a phenolic resin is used as the organic binder, a transition metal salt, such as a metal octoate compound or a metal naphthenate compound, compatible with the phenolic resin is selected.

Furthermore, a suspension of an ultrafine powder of the transition metal or a colloidal solution such as metal sol may be used. In this case, a colloidal solution containing fine particles of the transition metal or a salt thereof having a diameter of 1,000 nm or less dispersed in a solvent is used.

With respect to the proportion of the transition metal solution added, the concentration and amount of the transition metal in the transition metal solution are adjusted in such a manner that the proportion of the residual transition metal is 0.5% by mass or less relative to 100% by mass of the total mass of the powder components, such as the zirconia aggregates and the carbonaceous raw material antioxidant, before kneading, a solid component obtained by carbonizing the organic binder, and the mass of the residual transition metal, i.e., relative to 100% by mass of the refractory as a product.

Next, the resulting kneaded body is subjected to CIP as in the second step and then drying and firing in a nonoxidative atmosphere as in the third step.

In the firing step after shaping, the optimum temperature and time vary depending on the types of transition metals and thus are preferably selected so as to form the ultrafine fibrous carbon structure in the refractory structure, in particular, in the carbon bond.

For example, in the case of using Fe as a transition metal, from the viewpoint of promoting the formation of the ultrafine fibrous carbon structure, heat treatment is preferably performed at 600° C. to 800° C. for 30 to 120 minutes. In the case of using Ni as a transition metal, from the same viewpoint, heat treatment is performed at 600° C. to 1,200° C. and preferably 900° C. to 1,100° C. for 30 to 120 minutes.

In fact, however, it is necessary to determine the time for heat treatment in view of the modification of the organic binder and the carbonaceous raw material. For example, in the case of using a phenolic resin as the organic binder, since a temperature in which the volatile component of the phenolic resin is removed and the product is stabilized is 800° C. or higher, the heat treatment temperature needs to be 800° C. or higher and preferably about 900° C.

Figure 1A:
FIG. 1A is a photograph of a structure of a zirconia-carbon-containing refractory having a $ZrO_2$ content of 88% by mass according to the present invention with a field of view of about 500 µm.

The zirconia-carbon-containing refractory produced by the second production method according to the present invention has a structure shown in FIGS. 1A and 1B. In each of FIGS. 1A and 1B, the structure of the zirconia-carbon containing refractory includes coarse zirconia aggregate particles 1, graphite particles 2, carbon bonds 3 formed by carbonizing the organic binder, and transition metal-containing nanoparticles uniformly dispersed in each of the carbon bonds 3.

Figure 2B:
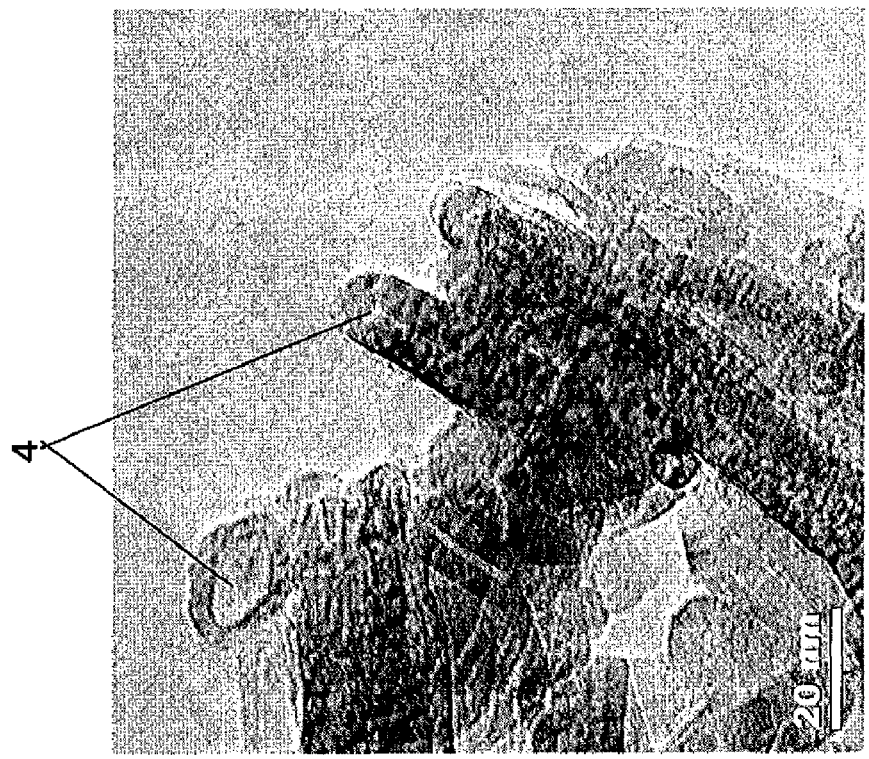
FIG. 2B is a photograph of a structure of a portion containing fine fibrous carbon having a size of 50 nm or less of a zirconia-carbon-containing refractory according to the present invention with a field of view of about 100 nm.
Figure 2A:
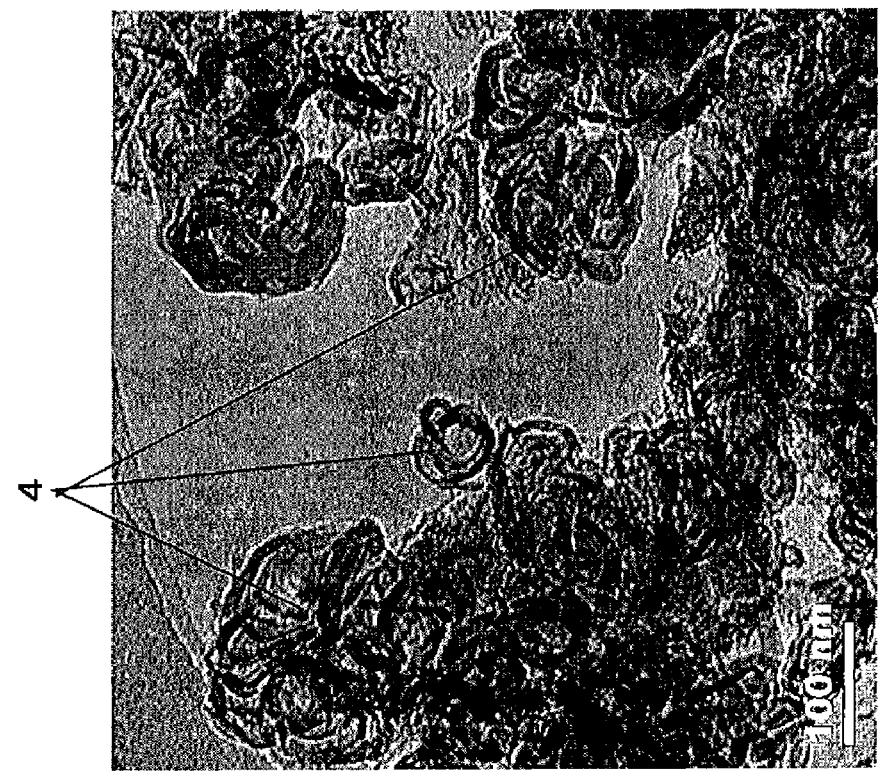
FIG. 2A is a photograph of a structure of a portion containing fine fibrous carbon having a size of 50 nm or less of a zirconia-carbon-containing refractory according to the present invention with a field of view of about 600 nm.

FIGS. 2A and 2B are enlarged TEM photographs showing portions of the carbon bonds shown in FIGS. 1A and 1B. With respect to carbon in the carbon bonds 3, many ultrafine fibrous carbon structures are observed around the transition metal-containing nanoparticles 4.

EXAMPLES

CaO-Stabilized zirconia aggregates, 98%-purity scaly graphite and carbon black as carbonaceous raw materials, and a phenolic resin as an organic binder were mixed in predetermined proportions, followed by kneading to form a green body. After the plasticity of the green body was adjusted, the green body was shaped by CIP. The resulting compact was dried and fired in a nonoxidative atmosphere at 900° C. for 3 hours.

Evaluation of corrosion resistance, i.e., evaluation of dissolution loss, was made as follows: A predetermined zirconia-graphite prism sample (20×20×160 mm) was immersed in a crucible for 120 minutes, the crucible containing a mold powder having a thickness of about 30 mm and a mass ratio of $CaO/SiO_2$ of 1.0 floating on the surface of low carbon steel melted at 1,550° C. to 1,570° C. After withdrawal of the sample, the amount of dissolution loss at the interface between the molten steel and the molten powder was measured and compared. The amount of dissolution loss was expressed as an index with respect to 100 of the amount of dissolution loss obtained in Comparative Example 1. At a dissolution loss index of 100 or more, there is a problem of corrosion resistance.

Evaluation of thermal shock resistance in terms of $\Delta T$ was made as follows: A cylindrical sample (with an outer diameter of 150 mm, an inner diameter of 100 mm, and a height of 80 mm) having an end face covered with a lid composed of the same material was heated to a predetermined temperature. The sample was subjected to thermal shock by immersing the sample in water from the lid side so as not to introduce water into the inside of the sample. The upper limit of $\Delta T$ was determined by the presence or absence of a break. $\Delta T$ is the temperature applied to the sample in the test. When a sample has a $\Delta T$ of 1,000° C. or higher, there is no problem of thermal shock fracture in operation in which general preheating is performed.

Evaluation of oxidation resistance was performed as follows; A sample was subjected to heat treatment at 1,400° C. for 3 hours in an air atmosphere. The thickness of the resulting oxidized layer was evaluated in terms of an index with respect to 100 of the thickness of an oxidized layer observed in Example 12.

Example A

Table 1 shows the effect of the total volume percent of the apparent porosity and the carbonaceous material and the proportion (%) of pores with a diameter of 10 μm or more on corrosion resistance and thermal shock resistance.

In each of Examples 1 to 6, the zirconia-graphite material containing 86% by mass of the $ZrO_2$ aggregates was used. A total volume percent of the apparent porosity and the carbonaceous material of 25% to 42% by volume resulted in satisfactory corrosion resistance and thermal shock resistance. In Comparative Example 1 in which the total volume percent of the apparent porosity and the carbonaceous material was as high as 44% and in which the zirconia-graphite material having a $ZrO_2$ content of 83% was used, the material exhibited excellent thermal shock resistance but poor corrosion resistance. In Comparative Example 2 in which the total volume percent of the apparent porosity and the carbonaceous material was 24% and in which the zirconia content was 86%, the temperature $\Delta T$ was as low as 900° C. because of a high density and a low apparent porosity, and the thermal shock resistance was reduced. In each of Comparative Examples 3 and 4 in which the materials having substantially the same apparent porosity as in Examples 5 and 6 were used and in which the proportions of pores each having a diameter of 10 μm or more exceeded 30% with respect to the total volume of pores, the corrosion resistance was reduced. In Comparative Example 5 in which the total volume percent of the apparent porosity and the carbonaceous material was 43%, the corrosion resistance was reduced.

TABLE 1

|  | Example 1 | Example 2 | Example 3 | Example 4 | Example 5 | Example 6 |
|---|---|---|---|---|---|---|
| Chemical composition (mass %) | | | | | | |
| $ZrO_2$ | 86 | 86 | 86 | 86 | 86 | 86 |
| CaO | 4 | 4 | 4 | 4 | 4 | 4 |
| F. C | 10 | 10 | 10 | 10 | 10 | 10 |
| Bulk specific gravity | 4.52 | 4.43 | 4.29 | 4.05 | 3.80 | 3.80 |
| Apparent porosity (%) | 4.6 | 6.5 | 9.4 | 14.5 | 19.9 | 19.9 |
| Volume percent of carbonaceous material | 20.3 | 20.3 | 20.3 | 20.3 | 20.3 | 20.3 |
| Total volume percent of apparent porosity and carbonaceous material | 25 | 27 | 30 | 35 | 40 | 40 |
| Percentage of pore with diameter of 10 μm or more | 0 | 0 | 0 | 0 | 13 | 30 |
| Dissolution loss index (lower is better) | 67 | 72 | 75 | 80 | 84 | 95 |
|  | Good | Good | Good | Good | Good | Good |
| Thermal shock resistance ($\Delta T$: spall threshold temperature) (° C.) | 1000 | 1050 | 1100 | 1150 | 1250 | 1250 |
|  | Good | Good | Good | Good | Good | Good |

|  | Example 7 | Comparative Example 1 | Comparative Example 2 | Comparative Example 3 | Comparative Example 4 | Comparative Example 5 |
|---|---|---|---|---|---|---|
| Chemical composition (mass %) | | | | | | |
| $ZrO_2$ | 86 | 83 | 86 | 86 | 86 | 86 |
| CaO | 4 | 4 | 4 | 4 | 4 | 4 |

TABLE 1-continued

| | | | | | | |
|---|---|---|---|---|---|---|
| F. C | 10 | 12 | 10 | 10 | 10 | 10 |
| Bulk specific gravity | 3.71 | 3.69 | 4.56 | 3.80 | 0.00 | 3.66 |
| Apparent porosity (%) | 21.8 | 21.2 | 3.7 | 19.8 | 20.0 | 22.7 |
| Volume percent of carbonaceous material | 20.3 | 22.8 | 20.3 | 20.3 | 20.3 | 20.3 |
| Total volume percent of apparent porosity and carbonaceous material | 42 | 44 | 24 | 40 | 40 | 43 |
| Percentage of pore with diameter of 10 μm or more | 18 | 30 | 0 | 32 | 35 | 25 |
| Dissolution loss index (lower is better) | 93 Good | 100 Bad | 60 Good | 101 Bad | 106 Bad | 105 Bad |
| Thermal shock resistance (ΔT: spall threshold temperature) (° C.) | 1250 Good | 1250 Good | 900 Bad | 1250 Good | 1250 Good | 1250 Good |

Example B

Table 2 shows the quality of the zirconia-graphite materials containing various proportions of the graphite fine powder and carbon black having a diameter of 45 μm or less in the carbonaceous material excluding the bonding carbon.

In Comparative Examples 6 and 7 and Examples 8 to 11, the proportions of the carbonaceous material having a diameter of 45 μm or less in the carbonaceous material excluding the bonding carbon were changed from 0% to 100%. At each of the proportions of 0% and 35% in Comparative Examples 6 and 7, the total volume percent of the apparent porosity and the carbonaceous material was 43% or more. The corrosion resistance was reduced. In contrast, at each of the proportions of the graphite fine powder of 40%, 60%, and 100% in Examples 8 to 10, both corrosion resistance and thermal shock resistance were significantly improved and satisfactory. In Example 11, part of (10%) the graphite fine powder was replaced with carbon black. The structure was densified, further improving the corrosion resistance.

increase in $ZrO_2$ content, fine fibrous carbon structures were formed in the refractory matrix structures. Table 3 shows the results.

To form the fine fibrous carbon structures, a sol solution containing metallic Ni having a diameter of 30 nm was added in an amount of 0.2%, 0.5%, or 0.6% by mass in terms of metallic Ni. In Example 12 in which the Ni catalyst was not contained, the results demonstrated that although the corrosion resistance was satisfactory, the spall threshold temperature ΔT was 1,000° C., which was the lower limit. In each of Example 13 in which the amount of Ni added was 0.2% by mass and Example 14 in which Ni the amount of Ni added was 0.5% by mass, the corrosion resistance was satisfactory. Furthermore, the addition of the Ni catalyst improved the thermal shock resistance temperature ΔT by 100° C. or higher, as compared with Example 12. After the test, observation of the bonding structure in the refractory with a transmission electron microscope (TEM) showed an aggregate structure of fibrous carbon having a size of 50 nm or less. It is believed that the bonding structure was modified with the

TABLE 2

| | | Comparative Example 6 | Comparative Example 7 | Example 8 | Example 9 | Example 10 | Example 11 |
|---|---|---|---|---|---|---|---|
| Chemical composition (mass %) | | | | | | | |
| $ZrO_2$ | | 86 | 86 | 86 | 86 | 86 | 86 |
| CaO | | 4 | 4 | 4 | 4 | 4 | 4 |
| F. C | | 10 | 10 | 10 | 10 | 10 | 10 |
| Proportion of carbonaceous material having 45 μm or less (excluding bonding carbon) | Graphite fine powder (%) | 0 | 35 | 40 | 60 | 100 | 90 |
| | Carbon black | | | | | | 10 |
| Bulk specific gravity | | 3.60 | 3.66 | 3.71 | 4.12 | 4.41 | 4.51 |
| Apparent porosity (%) | | 24.0 | 22.7 | 21.8 | 13.0 | 7.0 | 4.9 |
| Volume percent of carbonaceous material | | 20.3 | 20.3 | 20.3 | 20.3 | 20.3 | 20.3 |
| Total volume percent of apparent porosity and carbonaceous material | | 44 | 43 | 42 | 33 | 27 | 25 |
| Percentage of pore with diameter of 10 μm or more | | 32 | 31 | 18 | 11 | 0 | 0 |
| Dissolution loss index (lower is better) | | 106 Bad | 102 Bad | 93 Good | 76 Good | 72 Good | 67 Good |
| Thermal shock resistance (ΔT: spall threshold temperature) (° C.) | | 1250 Good | 1250 Good | 1250 Good | 1100 Good | 1050 Good | 1000 Good |

Example C

For zirconia-graphite materials having a $ZrO_2$ content of 88% by mass so as to have improved corrosion resistance, in order to improve a reduction in wear resistance due to the catalyst to improve the thermal shock resistance. In Example 15 in which the same Ni catalyst was added in an amount of 0.6% by mass, the corrosion resistance was reduced within the range of acceptable values. The oxidation resistance was markedly reduced compared with Example 14 (the Ni catalyst was added in an amount of 0.5% by mass).

TABLE 3

| Chemical composition (mass %) | Example 12 | Example 13 | Example 14 | Example 15 |
|---|---|---|---|---|
| $ZrO_2$ | 88 | 88 | 88 | 88 |
| CaO | 4 | 4 | 4 | 4 |
| F. C | 7.0 | 6.8 | 6.5 | 6.4 |
| Amount of Ni catalyst added (in term of metallic Ni) (mass %) | 0.0 | 0.2 | 0.5 | 0.6 |
| Bulk specific gravity | 4.11 | 4.11 | 4.11 | 4.11 |
| Apparent porosity (%) | 18.0 | 18.0 | 18.0 | 18.0 |
| Volume percent of carbonaceous material | 17.0 | 17.0 | 17.0 | 17.0 |
| Total volume percent of apparent porosity and carbonaceous material | 35 | 35 | 35 | 35 |
| Percentage of pore with diameter of 10 μm or more | 15 | 15 | 15 | 15 |
| Dissolution loss index (lower is better) | 72 | 73 | 76 | 80 |
|  | Good | Good | Good | Good |
| Thermal shock resistance (ΔT: spall threshold temperature) (° C.) | 1000 | 1100 | 1150 | 1150 |
|  | Good | Good | Good | Good |
| Oxidation resistance index 1400° C. for 3 hrs | 100 | 102 | 104 | 120 |
|  | Good | Good | Good | Bad |
| Presence or absence of fibrous carbon (50 nm or less) in bonding carbon | Absent | Present | Present | Present |

The foregoing experimental results demonstrated the following: The proportion of the carbonaceous material such as the graphite fine powder having a maximum length of 45 μm or less was set at 40% or more, thereby reducing the internal friction of the green body during shaping by CIP. Furthermore, the proportion of the open pores (apparent porosity) and the amount of open pores each having a diameter of 10 μm or more were significantly reduced, thereby markedly improving the densification and corrosion resistance of the structure. Moreover, the incorporation of the metal catalyst that promotes the formation of the fibrous carbon structure in an amount of 0.5% by mass or less resulted in further improvement in thermal shock resistance.

What is claimed is:

1. A zirconia-carbon-containing refractory comprising:
   aggregate grains;
   a carbon bond formed between the aggregate grains;
   80% by mass or more of a $ZrO_2$ component; and
   a carbonaceous material,
   wherein the total volume of open pores and the carbonaceous material in the structure of the refractory is in the range of 25% to 42% by volume,
   open pores each having a diameter of 10 μm or more account for 30% or less of the total volume of open pores in the structure of the refractory, and
   carbonaceous material grains each having a maximum length exceeding 45 μm in the carbonaceous material in the zirconia-carbon-containing refractory account for less than 60% by mass of the total mass of the carbonaceous material except the bonding carbon in the zirconia-carbon-containing refractory.

2. The zirconia-carbon-containing refractory according to claim 1, wherein the carbonaceous material includes a carbonaceous fibrous structure with a diameter of 50 nm or less.

3. The zirconia-carbon-containing refractory according to claim 2, further comprising:
   fine particles composed of a transition metal, a transition metal compound, or a metal catalyst that promotes the formation of fine carbon fibers, the fine particles each having a diameter of 1,000 nm or less,
   wherein the proportion of the transition metal or a metal derived from the transition metal compound is 0.5% by mass or less (excluding 0% by mass) with respect to the total mass of the refractory.

4. The zirconia-carbon-containing refractory according to claim 1, further comprising:
   fine particles composed of a transition metal, a transition metal compound, or a metal catalyst that promotes the formation of fine carbon fibers, the fine particles each having a diameter of 1,000 nm or less,
   wherein the proportion of the transition metal or a metal derived from the transition metal compound is 0.5% by mass or less (excluding 0% by mass) with respect to the total mass of the refractory.

5. A method for producing a zirconia-carbon-containing refractory according to claim 1, the method comprising:
   a first step of kneading a green body containing carbonaceous aggregate particles, wherein carbonaceous aggregate particles each having a maximum length of 45 μm or less account for 40% by mass or more of the total mass of the carbonaceous aggregate particles except a bonding carbon;
   a second step of forming the kneaded green body in the first step into a compact; and
   a third step of subjecting the resulting compact to heat treatment and processing.

6. The method according to claim 5,
   wherein in the first step, the green body contains fine particles composed of a transition metal, a transition metal compound, or a metal catalyst that promotes the formation of fine carbon fibers, the fine particles each having a diameter of 1,000 nm or less,
   wherein the proportion of the transition metal or a metal derived from the transition metal compound is 0.5% by mass or less (excluding 0% by mass) with respect to the total mass of the refractory.

* * * * *